United States Patent
Revol

(10) Patent No.: US 10,859,711 B2
(45) Date of Patent: Dec. 8, 2020

(54) RAILWAY POSITIONING METHOD AND SYSTEM

(71) Applicant: THALES, Courbevoie (FR)

(72) Inventor: Marc Revol, Upie (FR)

(73) Assignee: THALES, Courbevoie (FR)

(*) Notice: Subject to any disclaimer, the term of this patent is extended or adjusted under 35 U.S.C. 154(b) by 389 days.

(21) Appl. No.: 15/761,422

(22) PCT Filed: Sep. 2, 2016

(86) PCT No.: PCT/EP2016/070779
§ 371 (c)(1),
(2) Date: Mar. 19, 2018

(87) PCT Pub. No.: WO2017/050543
PCT Pub. Date: Mar. 30, 2017

(65) Prior Publication Data
US 2018/0259649 A1    Sep. 13, 2018

(30) Foreign Application Priority Data

Sep. 25, 2015    (FR) ..................... 15 01982

(51) Int. Cl.
*G01S 19/40* (2010.01)
*G01S 19/49* (2010.01)
(Continued)

(52) U.S. Cl.
CPC .............. *G01S 19/40* (2013.01); *G01S 19/43* (2013.01); *G01S 19/49* (2013.01); *G01S 19/246* (2013.01); *G01S 19/29* (2013.01); *G01S 19/50* (2013.01)

(58) Field of Classification Search
CPC .......... G01S 19/40; G01S 19/41; G01S 19/47; G01S 19/49; G01S 19/50
See application file for complete search history.

(56) References Cited

U.S. PATENT DOCUMENTS

| 5,416,712 A * | 5/1995 | Geier ................... G01C 21/165 342/357.3 |
| 8,803,736 B2 * | 8/2014 | Dai ....................... G01S 19/235 342/357.62 |
| 2005/0134503 A1 | 6/2005 | Colley et al. |

FOREIGN PATENT DOCUMENTS

| EP | 2 853 922 A1 | 4/2015 |
| FR | 2 971 857 A1 | 8/2012 |

OTHER PUBLICATIONS

Mueller, K. Tysen. "Low-COst, Drift Free DGPS Locomotive Navigation System." IDEA, Aug. 2003. pp. 1-31 (Year: 2003).*

(Continued)

*Primary Examiner* — Gregory C. Issing
(74) *Attorney, Agent, or Firm* — BakerHostetler

(57) ABSTRACT

A railway positioning method, based on the movement of a train determined by a signal receiver of a satellite navigation system embedded onboard the train, and on the movement of the train determined by an odometer embedded onboard the train, and a map of the railway tracks, by determination of the ionospheric propagation bias corresponding to a propagation bias of the signal carrier phase of the satellite navigation system, comprises the steps of, by line of sight of the satellites of the navigation system: estimating the biased ionospheric drift by difference between an integrated Doppler term determined by the receiver and a biased estimation of the movement of the train by the odometer; estimating the odometer drift bias and the drift bias of the local clock of the receiver, by least squares resolution of the speed determined by the satellite navigation system, of the drift bias of the local clock of the receiver, and of the odometer drift bias; correcting the estimation of the ionospheric drift, by subtraction of the estimated odometer drift bias; and correcting the integrated Doppler term using the drift bias of the local clock of the receiver and the ionospheric drift bias, and (Continued)

correcting the pseudo-distance deviations using the ionospheric drift bias.

8 Claims, 2 Drawing Sheets

(51) Int. Cl.
*G01S 19/43* (2010.01)
*G01S 19/50* (2010.01)
*G01S 19/24* (2010.01)
*G01S 19/29* (2010.01)

(56) References Cited

OTHER PUBLICATIONS

S. Bedrich et al., "GNSS-Based Sensor Fusion for Telematic Applications in Railway Traffic," GNSS 2004—Proceedings of the 17th International Technical Meeting of the Satellite Division of the Institute of Navigation, Sep. 24, 2004, pp. 681-691, XP056009183.

* cited by examiner

RAILWAY POSITIONING METHOD AND SYSTEM

CROSS-REFERENCE TO RELATED APPLICATIONS

This application is a National Stage of International patent application PCT/EP2016/070779, filed on Sep. 2, 2016, which claims priority to foreign France patent application No. FR 1501982, filed on Sep. 25, 2015, the disclosures of which are incorporated by reference in their entirety.

FIELD OF THE INVENTION

The invention relates to a railway positioning method and system with high integrity level targeting an objective of risk of non-integrity of the position and of the speed of the order of $10^{-9}$/h to $10^{-11}$/h.

BACKGROUND

Positioning railway convoys requires a high level of integrity, currently achieved by non-autonomous location means on the train, associated with track infrastructures, such as ground passage sensors, RFID beacons, or an accurate and integrated map of the tracks, etc.

The maintenance costs, the control difficulties and the efforts in deploying such devices however present a limitation on their development, and on the improvement of the performance thereof.

The use of location by a satellite navigation system, or GNSS, the acronym for "Global Navigation Satellite System", for the positioning of trains, targets an autonomous location (performed onboard the train) without other means on the ground, with integrity levels compatible with the objectives sought in the railway field.

However, such objectives (of the order of 10-11/h) are well above the integrity capabilities provided by the GNSS systems, even when they are augmented by dedicated means on the ground such as those of a space augmentation system, or SBAS, the acronym for "satellite-based augmentation system", for ensuring the monitoring of the signals (typically with a risk of non-integrity of the order of 10-7/h).

Furthermore, currently, only the GPS constellation allows a secure location, within targeted accuracy fields (in terms of protection radius), and benefiting in the short term from cross-control with other constellations cannot be envisaged.

A significant limitation on the reduction of the risk of non-integrity of the GNSS positioning is linked to the degradations of the GNSS measurements due to the reception environment local to the receiver (in particular the multiple paths and the interferences).

In uncontrolled environments such as rail environments, the occurrence and the amplitude of the errors generated by these local disturbances deviate notably from the statistical distribution of the GNSS measurement errors, accepted as a Gaussian distribution.

These errors are difficult to monitor using an instantaneous receiver ("snapshot"), the measurement noises of which do not allow the errors to be detected with a sufficient level of confidence (or PND, the acronym for "probability of non-detection"), within the objective protection radius.

An alternative to this limitation consists in improving the accuracy of the measurements by lines of sight (and therefore of absolute positioning) by time integration of the pseudo-distance measurements, after compensation of the movement of a carrier with an embedded GNSS receiver through the use of the phase of the carrier (the measurements that are greatly noise-affected by pseudo-distances undergo a code-carrier filtering over a horizon dependent on the desired level of reduction).

For a desired protection radius, the filtering by carrier allows:

the standard deviation of the inaccuracy of the Gaussian contribution of the measurement noise to be reduced, and the errors linked to the local disturbances, to be identified with increased efficiency (lower PND) in order to exclude them from the position resolution.

These two conditions are essential for exceeding the integrity risk levels commonly attributed to satellite positioning.

However, such a filtering by the carrier phase is feasible only in the case of two-frequency GNSS receivers ("P(Y)" military GPS, or fixed geodesy receivers with "semi-code-less tracking"), because of the carrier phase divergence with respect to time linked to the evolution of the ionospheric propagation.

There is currently no way of performing a single-frequency code-carrier filtering that is insensitive to the effect of ionospheric divergence.

SUMMARY OF THE INVENTION

One aim of the invention is to mitigate the abovementioned problems.

There is proposed, according to one aspect of the invention, a railway positioning method, based on the movement of a train determined by a signal receiver of a satellite navigation system embedded onboard the train, and on the movement of said train determined by an odometer embedded onboard the train and a map of the railway tracks, by periodic determination (every 1 to 10 seconds) of the ionospheric propagation bias corresponding to a propagation bias of the signal carrier phase of the satellite navigation system, comprising the steps of, by line of sight of the satellites of the navigation system:

estimating the ionospheric drift bias over an observation period by difference between an integrated Doppler estimation performed by the receiver and a biased estimation of the movement of the train performed by the odometer;

estimating the odometer drift bias and the drift bias of the local clock of the receiver, by least squares resolution, of the speed of the train, of the drift bias of the local clock of the receiver, and of the odometer drift bias;

correcting the estimation of the ionospheric drift, by subtraction of the estimated odometer drift bias; and correcting the integrated Doppler term using the drift bias of the local clock of the receiver and the ionospheric drift bias, and correcting the pseudo-distance deviations using the ionospheric drift bias.

Thus, the observation of the drift bias of the odometer allows for a measurement of the movement of the carrier (train) over a known curvilinear path which can be used as reference for the observation of the drift of the ionospheric bias.

The single-frequency GNSS measurements of pseudo-distances and of integrated Doppler can thus be corrected of the drift effect of the group delay and of the carrier phase, which otherwise limits the convergence capability of the code-carrier filtering, usually applied to reduce the pseudo-distance error.

In one mode of implementation, the method further comprises a step of, by line of sight of the satellites of the navigation system, filtering, the pseudo-distance measurements by the integrated Doppler measurements stripped of their ionospheric bias over a period ranging from a few tens of seconds to a few hundreds of seconds.

Thus, a filtering of the code by the carrier is performed, ensuring a medium-term convergence (over several tens of seconds) of the filtered pseudo-distance which is not biased by the temporal variation of the ionospheric error.

According to one mode of implementation, the method further comprises a step of, by line of sight of the satellites of the navigation system, periodically estimating (approximately every 10 minutes to 30 minutes) the ionospheric delay error based on the pseudo-distance residues derived from the code-carrier filtering, supplied by least squares resolution of the position and of the time of the receiver in single-frequency mode.

Thus, with the pseudo-distance estimation noise having been able to be reduced significantly by code-carrier filtering, because of the elimination of the drift of the ionospheric error, the ionospheric propagation delay then constitutes the major budget of the pseudo-distance error by line of sight which is observed through the pseudo-distance residues. The ionospheric delay bias by line of sight is therefore made observable based on the estimation of the filtered pseudo-distance residues, derived from the least squares resolution of the GNSS position (PVT).

In one mode of implementation, the method further comprises a step of:

performing a first estimation (every second) of the instantaneous filtered pseudo-distance residues, obtained by a first step of least squares resolution of the position and of the time bias of the local clock of the receiver, then filtering these instantaneous pseudo-distance residues over a period of 10 seconds to 100 seconds, and finally correcting the pseudo-distances obtained subsequently with these stored filtered residues, over a time horizon of 10 minutes to 30 minutes.

Thus, the filtered pseudo-distance measurements are stripped of the ionospheric delay biases.

In one mode of implementation, the method further comprises a step of resolving by least squares the position and the time bias of the local clock of the receiver, on the basis of said filtered pseudo-distance measurements.

Thus, the accuracy performance levels achieved are of the level of those obtained with the differential positioning systems, but without fixed infrastructures on the ground necessary for observing the ionospheric propagation biases.

According to one mode of implementation, the estimation of the ionospheric error terms by satellite line of sight is performed over a period of between 10 and 100 seconds, and repeated approximately every 10 minutes to 30 minutes.

Thus, the correction of the ionospheric errors is updated regularly so as to adapt to the local and temporal trends of the ionospheric propagation errors.

In one mode of implementation, said period is a second.

There is also proposed, according to another aspect of the invention, a railway positioning system, based on the movement of a train determined by a signal receiver of a satellite navigation system embedded onboard the train, and on the movement of said train determined by an odometer embedded onboard the train, and a map of the railway tracks, by determination of the ionospheric propagation bias corresponding to a propagation bias of the signal carrier phase of the satellite navigation system, comprising a computer configured to perform the steps of, by line of sight of the satellites of the navigation system:

estimating the biased ionospheric drift by difference between an integrated Doppler term determined by the receiver and a biased estimation of the movement of the train by the odometer;

estimating the odometer drift bias and the drift bias of the local clock of the receiver, by least squares resolution of the speed determined by the satellite navigation system, of the drift bias of the local clock of the receiver, and of the odometer drift bias;

correcting the estimation of the ionospheric drift, by subtraction of the estimated odometer drift bias; and correcting the integrated Doppler term using the drift bias of the local clock of the receiver and the ionospheric drift bias, and correcting the pseudo-distance deviations using the ionospheric drift bias.

BRIEF DESCRIPTION OF THE DRAWINGS

The invention will be better understood on studying a few embodiments described as nonlimiting examples and illustrated by the attached drawings in which.

Figure 1:
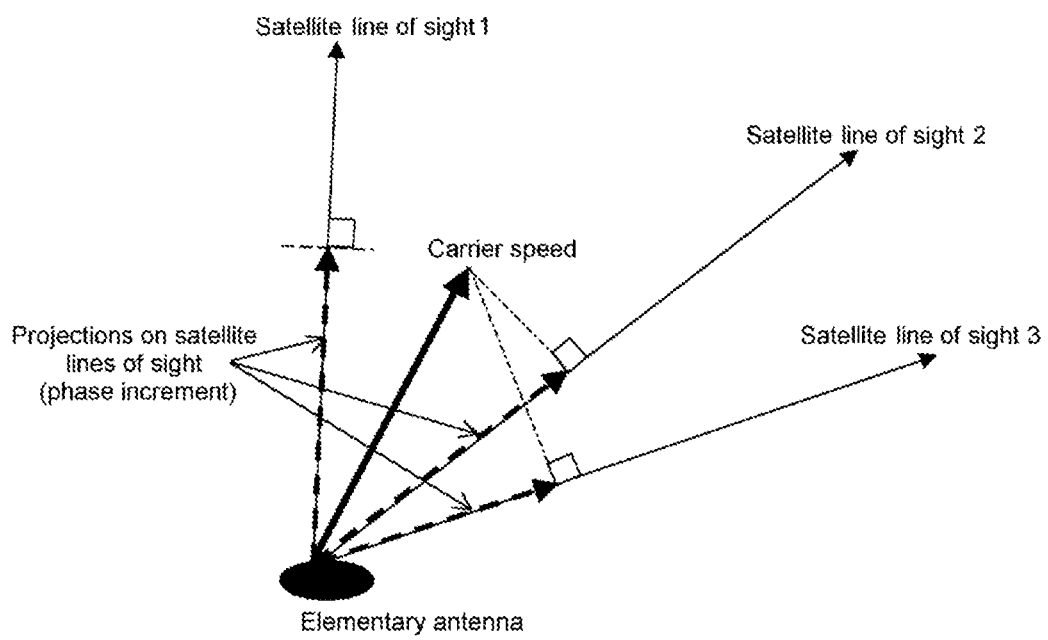
FIG. 1 schematically illustrates the projection of the speed vector of the train toward the lines of sight of the satellites.

In the different figures, the elements that have the same references are identical.

DETAILED DESCRIPTION

The present invention exploits the fact that the train moves on tracks whose plan is known perfectly or at the very least with sufficient confidence recognized by the prior art of the field.

As a first approach, under the simplifying hypothesis that the odometer measurement is not biased, the invention aims to identify the drift of the ionospheric propagation delay error (also referred to in short as ionospheric drift throughout the rest of the present description) by comparison of the movement corresponding to the trend of the carrier phase by satellite line of sight (in the satellite line of sight), with the movement according to the map measured by the odometer embedded onboard the train.

The comparison of the GNSS and odometer movements provides, at each instant, the ionospheric drift in the direction of each of the lines of sight of the satellites of the GNSS system.

The GNSS carrier phase measurements can thus be stripped of the drifts of the ionospheric error, and therefore make it possible to perform an effective long-term filtering of code-carrier type, to gain in accuracy and in integrity.

However, it is well known that the odometer measurements drift rapidly (approximately by 5% to 10% of the distance traveled), which would make this approach unusable as the GNSS position error would then once again include the error linked to the drift of the odometer.

The compensation of the movement measured on the basis of the integrated Doppler by the movement estimated by the odometer therefore shows a residual bias on the estimation of the drift of the ionospheric delay by line of sight, $bd_{iono_i}$, equal to the projection of the odometer movement bias $\beta_{odo}t$ on each of the directions $\vec{s}_i$ of the satellite axes:

Let, $Dep_{vrai}$: be the true movement of the train on its direction of movement t, over the observation period $\Delta t$, in meters, $d_{iono}$: be the drift (unknown) of the ionospheric delay, reduced to meters, in the direction $s_i$ of the satellite i, and over the observation period $\Delta t$, $\beta_{odo}$: be the drift (unknown) of the measurement of the movement, in meters, supplied by the odometer (also hereinafter called odometer drift bias) in the direction of the movement t, and over the observation period $\Delta t$, $Dop\_int_i$: be the integrated Doppler, reduced to meters, measured by the receiver on the basis of the carrier phase in the direction $s_i$ of the satellite i, and over the observation period $\Delta t$ etc.

$Dep_{odo}$: be the movement, in meters, measured by the odometer in the direction t of the movement t of the train, and over the observation period $\Delta t$, and t: be the unitary directing vector in radians of the movement of the train, assumed constant over the observation period $\Delta t$, etc.

The following relationships can be written:

$$Dop\_int_i s_i = (Dep_{vrai} t \circ s_i) s_i + d_{iono_i} s_i$$

$$Dep_{odo} t = Dep_{vrai} t + \beta_{odo} t$$

In which the operator "$\circ$" represents the scalar product between the vectors.

The estimation of the ionospheric drift $\hat{d}_{iono_i} s_i$ (in the direction of the line of sight of the satellite i, si) performed by the difference between the integrated Doppler term derived from the receiver and the estimation of the distance traveled supplied by the odometer (assumed without bias), is written in the following form:

$$\hat{d}_{iono_i} s_i Dop\_int_i s_i - (\hat{D}ep_{vrai} t \circ s_i) s_i + d_{iono_i} s_i$$

In which:

$$\hat{D}ep_{vrai} t = Dep_{odo} t$$

hence the following relationship:

$$\hat{d}_{iono_i} s_i = Dop\_int_i s_i - (Dep_{odo} t \circ s_i) s_i$$

in which:

t represents the unitary directing vector of the movement of the train, $s_i$ represents the unitary directing vector of the line of sight of the satellite i, hence, the following applies:

$$\hat{d}_{iono_i} s_i = d_{iono_i} s_i + (\beta_{odo} t \circ s_i)$$

The estimation of the ionospheric drift (biased ionospheric drift) is therefore adversely affected by a bias $bd_{iono_i}$ (ionospheric drift bias) equal to:

$$bd_{iono_i} = \beta_{odo} \cdot t \circ s_i$$

S represents the unitary directing vector in the direction of each satellite line of sight, the latter can be written in the local geometrical frame of reference according to the following relationship:

$$s_i = \cos(El^i)\cos(Az^i)i + \cos(El^i)\sin(Az^i)j + \sin(El^i)k \quad (1)$$

in which:

i, j, k are the three unitary vectors of the local reference frame ($X^b$, $Y^b$, $Z^b$)

$El^i$ and $Az^i$ are the angles of elevation of each line of sight i in the local reference frame, in accordance with FIG. 1 opposite, in radians).

t represents the unitary directing vector of the trajectory of the train assumed rectilinear during the period of measurement of the integrated Doppler on the satellite signals (which is legitimate in the case of rail or maritime applications, over a typical period of 1 second), the latter can be written, in the local geometrical frame of reference, according to the following relationship:

$$t = \cos(El_t)\cos(Az_t)i + \cos(El_t)\sin(Az_t)j + \sin(El_t)k \quad (2)$$

in which:

i, j, k are the 3 unitary vectors of the local reference frame ($X^b$, $Y^b$, $Z^b$)

$El^i$ and $Az^i$ are the angles of elevation and of azimuth of the direction of the trajectory of the train in the local reference frame, assumed known also by virtue of the map matching.

The following relationships then apply:

$$\beta_{odo} = \beta_{odo} t$$

$$i \circ \beta_{odo} = \beta_{odo} i \circ t = \beta_{odo} \cdot \cos(El_t) \cdot \cos(Az_t)$$

$$j \circ \beta_{odo} = \beta_{odo} j \circ t = \beta_{odo} \cdot \cos(El_t) \cdot \sin(Az_t)$$

$$k \circ \beta_{odo} = \beta_{odo} k \circ t = \beta_{odo} \cdot \sin(El_t)$$

in which the operator "$\circ$" represents the scalar product between the vectors.

When n satellites are visible, the set of the residual ionospheric drift biases by line of sight can therefore be expressed in the following form:

$$\begin{bmatrix} bd_{iono_1} \\ bd_{iono_2} \\ \vdots \\ bd_{iono_n} \end{bmatrix} = \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} i \circ \beta_{odo} \\ j \circ \beta_{odo} \\ k \circ \beta_{odo} \end{bmatrix}$$

$$\begin{bmatrix} bd_{iono_1} \\ bd_{iono_2} \\ \vdots \\ bd_{iono_n} \end{bmatrix} = \beta_{odo} \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} i \circ t \\ j \circ t \\ k \circ t \end{bmatrix}$$

The novelty of the proposed solution thus lies not only in the fact of compensating the GNSS carrier phase measurements by the odometer movements, but also of then resolving the GNSS speed on the basis of the integrated Doppler measurements obtained after compensation, by virtue of the preceding expression which linearly links the vector of the residual ionometer biases and the odometer drift bias.

FIG. 1 represents the projection of the speed vector of the train in the direction of the lines of sight of the satellites.

The additional bias linked to the odometer drift ($\beta_{odo}$) then can be estimated by a least squares resolution of the speed performed on the basis of the compensated integrated Dopplers, obtained on all of the lines of sight, but requires an additional line of sight for its resolution of the vector: ($V_x$, $V_y$, $V_z$, $\delta_t$, $\beta_{odo}$).

All the integrated Doppler measurements obtained by satellite line of sight will therefore be affected by a residual ionospheric drift estimation bias (the ionospheric drift bias), derived from a common bias (the odometer drift bias) corresponding to the drift of the odometer measurement.

$$\begin{bmatrix} \hat{m}_1 \\ \hat{m}_2 \\ \vdots \\ \hat{m}_n \end{bmatrix} = \begin{bmatrix} m_1 + bd_{iono_1} \\ m_2 + bd_{iono_2} \\ \vdots \\ m_n + bd_{iono_n} \end{bmatrix} + \begin{bmatrix} v_1 \\ v_2 \\ \vdots \\ v_n \end{bmatrix}$$

in which, $bd_{iono_i}$ is the residual ionospheric drift bias by line of sight i, in meters, over the observation period $\Delta t$ $v_i$ is the thermal noise of measurement of the integrated Doppler assumed Gaussian centered, of standard deviation $\sigma_i$, over the observation period $\Delta t$, in meters $m_i$ corresponds to the true integrated Doppler of the movement over the observation period $\Delta t$, in meters, and $\hat{m}_i$, corresponds to the integrated Doppler over the observation period $\Delta t$, estimated by the receiver on the basis of the carrier phase in the direction $s_i$ of the satellite i, in meters This bias is added to the drift bias of the local clock of the receiver ($\delta_t$) which is conventionally resolved in the case of an estimation of speed of the receiver on the basis of the integrated Doppler measurements by satellite line of sight.

$$\begin{bmatrix} \hat{m}_1 \\ \hat{m}_2 \\ \vdots \\ \hat{m}_n \end{bmatrix} = \begin{bmatrix} m_1 + bd_{iono_1} - c.\delta_t \\ m_2 + bd_{iono_2} - c.\delta_t \\ \vdots \\ m_n + bd_{iono_n} - c.\delta_t \end{bmatrix} + \begin{bmatrix} v_1 \\ v_2 \\ \vdots \\ v_n \end{bmatrix}$$

in which, $\delta_t$ is the drift bias of the clock of the receiver, over the observation period $\Delta t$, in seconds Again let, by replacing the ionospheric drift bias by its expression as a function of the drift of the odometer:

$$\begin{bmatrix} \hat{m}_1 \\ \hat{m}_2 \\ \vdots \\ \hat{m}_n \end{bmatrix} = \begin{bmatrix} m_1 - c.\delta_t \\ m_2 - c.\delta_t \\ \vdots \\ m_n - c.\delta_t \end{bmatrix} + \beta_{odo} \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} i \circ t \\ j \circ t \\ k \circ t \end{bmatrix} + \begin{bmatrix} v_1 \\ v_2 \\ \vdots \\ v_n \end{bmatrix}$$

Knowing that the true movement (integrated Doppler) by satellite line of sight is linked to the true speed of the train by the following conventional relationship:

$$\begin{bmatrix} m_1 \\ m_2 \\ \vdots \\ m_n \end{bmatrix} = \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} \omega_X \\ \omega_Y \\ \omega_Z \end{bmatrix}$$

in which, $\omega_X, \omega_Y, \omega_Z$, are the components of the true speed of the train in the local reference frame, $m_i$ is the true integrated Doppler for the satellite i, It is then possible to express a linear relationship between the integrated Doppler measurements and the components of a state vector taking into account the speed of the train, the odometer drift bias and the clock drift bias of the receiver:

$$\begin{bmatrix} \hat{m}_1 \\ \hat{m}_2 \\ \vdots \\ \hat{m}_n \end{bmatrix} = \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} \omega_X \\ \omega_Y \\ \omega_Z \end{bmatrix} -$$

$$\begin{bmatrix} c.\delta_t \\ c.\delta_t \\ \vdots \\ c.\delta_t \end{bmatrix} + \beta_{odo}, \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} i \circ t \\ j \circ t \\ k \circ t \end{bmatrix} + \begin{bmatrix} v_1 \\ v_2 \\ \vdots \\ v_n \end{bmatrix}$$

Again let, $$\begin{bmatrix} \hat{m}_1 \\ \hat{m}_2 \\ \vdots \\ \hat{m}_n - \end{bmatrix} = \begin{bmatrix} i \circ s_1 & j \circ s_1 & k \circ s_1 \\ i \circ s_2 & j \circ s_2 & k \circ s_2 \\ \vdots & \vdots & \vdots \\ i \circ s_n & j \circ s_n & k \circ s_n \end{bmatrix} \begin{bmatrix} \omega_X - \beta_{odo}.i \circ t \\ \omega_Y - \beta_{odo}.j \circ t \\ \omega_Z - \beta_{odo}.k \circ t \end{bmatrix} - \begin{bmatrix} c.\partial_t \\ c.\partial_t \\ \vdots \\ c.\partial_t \end{bmatrix} + \begin{bmatrix} v_1 \\ v_2 \\ \vdots \\ v_n \end{bmatrix}$$

in which $\partial_t$ is the drift bias of the clock of the receiver, over the observation period $\Delta t$, in seconds.

And, after development of the product and factorization of the terms of the state vector:

$$\begin{bmatrix} m_1 \\ m_2 \\ \vdots \\ m_n \end{bmatrix} = \begin{bmatrix} i \circ s_1 & j \circ s_1 & k \circ s_1 & -((i \circ s_1).(i \circ t) + (j \circ s_1).(j \circ t) + (k \circ s_1).(k \circ t)) & -c \\ i \circ s_2 & j \circ s_2 & k \circ s_2 & -((i \circ s_2).(i \circ t) + (j \circ s_2).(j \circ t) + (k \circ s_2).(k \circ t)) & -c \\ \vdots & \vdots & \vdots & \vdots & \vdots \\ i \circ s_n & j \circ s_n & k \circ s_n & -((i \circ s_n).(i \circ t) + (j \circ s_n).(j \circ t) + (k \circ s_n).(k \circ t)) & -c \end{bmatrix} \cdot \begin{bmatrix} \omega_X \\ \omega_Y \\ \omega_Z \\ \beta_{odo} \\ \partial_t \end{bmatrix} + \begin{bmatrix} v_1 \\ v_2 \\ \vdots \\ v_n \end{bmatrix} \quad (2a)$$

or else, $m = H.\omega + v$ (2b)

with, $\omega = \begin{bmatrix} \overline{\omega}_x \\ \overline{\omega}_y \\ \omega_z \\ \beta_{odo} \\ \delta_t \end{bmatrix}$ and $H = \begin{bmatrix} i \circ s_1 & j \circ s_1 & k \circ s_1 & -((i \circ s_1).(i \circ t) + (j \circ s_1).(j \circ t) + (k \circ s_1).(k \circ t)) & -c \\ i \circ s_2 & j \circ s_2 & k \circ s_2 & -((i \circ s_2).(i \circ t) + (j \circ s_2).(j \circ t) + (k \circ s_2).(k \circ t)) & -c \\ \vdots & \vdots & \vdots & \vdots & \vdots \\ i \circ s_n & j \circ s_n & k \circ s_n & -((i \circ s_n).(i \circ t) + (j \circ s_n).(j \circ t) + (k \circ s_n).(k \circ t)) & -c \end{bmatrix}$ The state vector of the train is then estimated by least squares:

$$\hat{\omega} = (H^T H)^{-1} H^T m \quad (3)$$

By writing the vector of the estimation errors in the form $\tilde{\omega} = \omega - \hat{\omega}$, the following applies: $\tilde{\omega} = \omega - \hat{\omega} = -(H^T H)^{-1} H^T v$ (4)

The covariance matrix of the errors is then given (assuming a normal distribution of the residual noise) by:

$$\operatorname{Var}(\tilde{\omega}) = E[(\omega - \hat{\omega})(\omega - \hat{\omega})^T] \quad (5)$$
$$= (H^T H)^{-1} H^T R H (H^T H)^{-1}$$

in which $R = E(vv^T)$ is the covariance matrix in terms of noise only.

By assuming that the standard deviation of the integrated Doppler measurement noise for each line of sight is identical to $\sigma_v$, then the error matrix of the estimate becomes:

$$\operatorname{Var}(\tilde{\omega}) = \sigma_v^2 (H^T H)^{-1} \quad (6a)$$

or else, in normalized form:

$$\Sigma = \frac{\operatorname{Var}(\tilde{\omega})}{\sigma_v^2} = (H^T H)^{-1} \quad (6b)$$

Also, the matrix H evolves according to the configuration of the satellite constellation (number of satellites, directions of the lines of sight), thus modifying the navigation accuracy.

The square route of the trace of this variance represents the dilution of accuracy due to the geometry of the satellites (GDOP) making it possible to estimate the resulting navigation performance;

$$GDOP = \sqrt{\operatorname{Trace}[(H^T H)^{-1}]} \quad (7)$$

Typically, a GDOP (GPS) of 3 and a phase measurement noise of 1 cm (in thermal noise only, once the ionospheric errors have resolved) leads to a speed accuracy of 3 cm/s (0.1 km/h), in the case of measurements performed every second and with an absolute positioning accuracy after code-carrier filtering (still after elimination of the ionospheric error) of a few centimeters after one minute of filtering.

The residual error is equivalent for the estimation of the drift of the odometer, which leads to an error of approximately 2 m in case of masking of a minute of the GNSS.

The unbiased ionospheric resolution of the instantaneous GNSS speed of the train and of the instantaneous drift bias of the odometer then makes it possible:

to reconstruct the trend of the debiased carrier phase and to perform the code-carrier filtering of the pseudo-distance measurements, to obtain a centimeter-scale positioning accuracy of the train to near convergence of the code-carrier filter (typically of 60s to 100s)

to monitor, on the basis of the trend of the carrier phase, the multiple path (and interference) errors, in order to clearly improve the integrity performance levels of the system to perform an ongoing estimation of the bias of the odometer which makes it possible to augment the continuity of the positioning of the train in case of loss of availability of the GNSS (loss of visibility, detection of multiple paths, unavailability of integrity, etc.).

Figure 2:
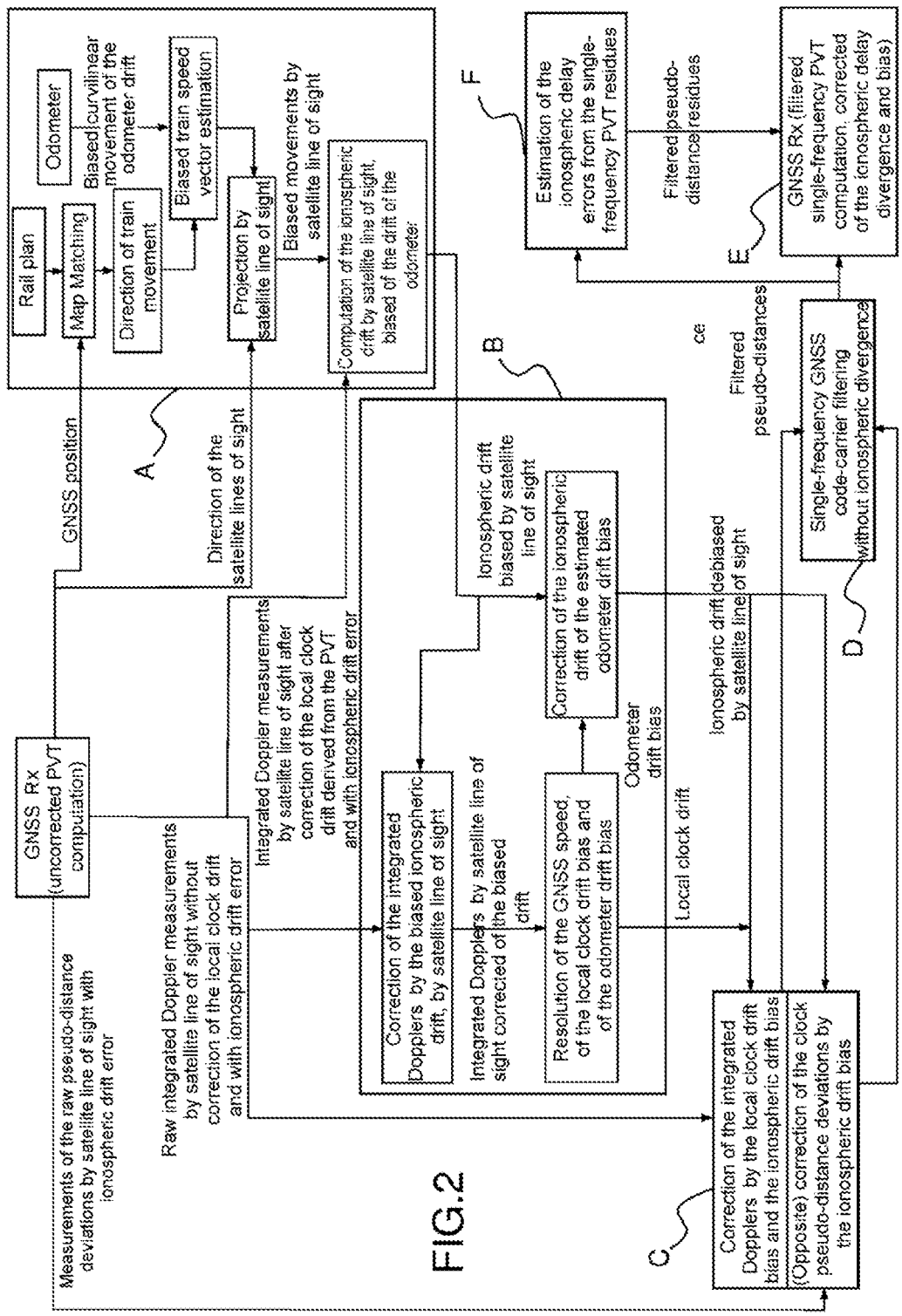
FIG. 2 schematically illustrates a mode of implementation of the method according to an aspect of the invention.

FIG. 2 illustrates a mode of implementation of the method according to one aspect of the invention.

FIG. 2 describes all of the steps leading to the ultimate provision of a single-frequency GNSS PVT point that is accurate (i.e. of the order of 1 cm of error), conventionally obtained after code-carrier filtering, but here after the measurements of the trends of code phase (pseudo-distance deviations) and of carrier (integrated Doppler) have been stripped of the code-carrier divergence error linked to the propagation of the GNSS waves in the ionosphere, which, normally, limit the duration of the filtering.

PVT point should be understood to mean the resolution by least squares of the position P, of the speed V and of the time bias of the local clock T, performed by the GPS receiver on the basis of the raw pseudo-distance and integrated Doppler measurements, by satellite line of sight.

This observation of the divergence of the ionospheric error is made partially possible, according to a first innovative principle, by virtue of the additional movement measurements supplied by an odometer and a route plan (rail in the case of the railway). "Partially", because the odometer itself drifts and therefore does not on its own allow the ionospheric divergence to be corrected.

To resolve this problem, the second innovative principle consists in resolving in the short term (each second or hundred milliseconds), simultaneously the speed, the time drift of the local clock (drift bias of the clock) and the drift of the odometer (odometer drift bias), the observability of which has been demonstrated on the basis of the raw integrated Doppler measurements supplied conventionally by the GNSS receiver.

That done, the third innovative principle consists in performing a code-carrier filtering on the basis of the measurements of pseudo-distance and of integrated Doppler stripped (on each one second or one hundred millisecond recurrence) of the ionospheric drift thus estimated, then in producing an accurate PVT point on the basis of the filtered pseudo-distance measurements, this being done with a single-frequency receiver and without SBAS augmentation, and without restriction of geographic application linked to the ionospheric divergence (equatorial regions for example).

Finally, a last innovative principle consists in estimating the ionospheric delay biases by line of sight (and no longer ionospheric drift errors) on the basis of the pseudo-distance residues obtained after least squares; the pseudo-distance measurement noise after code-carrier filtering being negligible (a few centimeters) compared to the ionospheric delay bias (several tens of meters), the periodic observation (approximately every 10 minutes to 30 minutes) of the pseudo-distance residues obtained after least squares upon the resolution of the position (P) and the filtering thereof over a period of approximately 10 to 100 seconds provides a good estimation of just these ionospheric biases, which can then be reused to correct the filtered code-carrier pseudo-distance measurements.

It should be recalled that the divergence of the ionospheric error simultaneously affects the measurements of code (pseudo-distances) and of carriers (integrated Doppler), but, in reverse directions, which prevents, in the zones affected by the ionospheric propagation variations, performing a code-carrier filtering (subtraction between the trends of pseudo-distance estimated on the basis of the wideband code, and of those estimated on the basis of the carrier phase).

Basically, the comparison between the integrated Doppler and the movement supplied by the odometer is used first of all to assess the carrier phase drift (or integrated Doppler) linked to the ionospheric propagation.

This comparison makes it possible to reduce the movement measurement error observed through the GNSS phase, and thus makes it possible to reduce the position error after "code-carrier" filtering (i.e. integration over time of the measurements of pseudo-distances (greatly noise-affected) once stripped (subtracted) of the movement supplied by the integrated Doppler (the presence of a phase drift linked to the ionospheric error otherwise introduces a bias which limits the convergence, therefore the accuracy of accessible positions).

The speed bias of the odometer (odometer drift bias) does however prevent a "direct" observation of the ionospheric error; by contrast, this drift of the odometer movement being common, it can be observed by projection of this error onto each line of sight, as explained previously (see FIG. 1).

Basically, the ionospheric propagation brings about an unknown delay on the pseudo-distance measurement ("ionospheric error").

This error evolves over time according to the physical nature of the ionospheric layer (drift of the ionospheric error, mentioned as "ionospheric drift"). As long as this drift error has not been estimated, it introduces an "ionospheric drift bias" on the integrated Doppler measurements.

Since the layer is dispersive, this trend occurs in reverse direction on the wideband measurements of code (pseudo-distance) and of carrier (carrier phase from which the integrated Doppler results).

There are not therefore two computations, but a processing operation in two steps A and B:

Step A) first of all, estimation every 1 to 10 seconds of the ionospheric propagation biases (ionospheric drift) by line of sight, by subtraction from the integrated Doppler measurements by satellite line of sight, of the (biased) odometer movement projected onto the lines of sight;

Step B) then, estimation every 1 to 10 seconds of the drift bias of the local clock (which supplies the local time of the receiver) and of the odometer drift bias, by least squares resolution of the GNSS speed.

Once the bias of the odometer is known, the following processing operations are carried out:

Step C) correction of the ionospheric propagation biases obtained in step A) by the clock drift and odometer drift biases obtained in step B), for each satellite line of sight.

Step D) code-carrier filtering, of the pseudo-distance measurements by the integrated Doppler measurements stripped of their ionospheric propagation biases, over a period ranging from a few tens of seconds to a few hundreds of seconds.

Step E) conventional least squares resolution of the position and of the GNSS time, based on the filtered pseudo-distance measurements obtained in step D).

To be complete, it is also essential to add a final step F) of estimation approximately every 10 minutes to 30 minutes of the ionospheric delay errors (and no longer of the ionospheric drift errors) based on the pseudo-distance residues obtained by least squares resolution of the position each second; the residues are then filtered over a period of between 10 and 100 seconds.

Once these delay errors are obtained in the initialization phase, the precise PVT point can be maintained by continuous correction of the ionospheric drift and by use of the odometer (corrected of its drift) in case of GNSS masking.

It is also necessary to mention the "natural" drops in the code-carrier filtering without ionospheric drift, that are the partial reduction of the errors linked to the multiple paths and to the interferences (in fact, it is very important for the railway applications in the tropical/equatorial regions or in the far north), which significantly impact the accuracy of the positioning and reduce the integrity of the GNSS.

The invention claimed is:

1. A railway positioning method, based on a movement of a train determined by a signal receiver of a satellite navigation system embedded onboard the train, on a movement of said train determined by an odometer embedded onboard the train, and a map of railway tracks, by periodic determination of an ionospheric propagation bias corresponding to a propagation bias of a signal carrier phase of the satellite navigation system, comprising the steps implemented when in a line of sight of satellites of the satellite navigation system:

estimating (A) an ionospheric drift bias over an observation period by determining a difference between an integrated Doppler estimation from satellite signals performed by the signal receiver and a biased estimation of the movement of the train performed by the odometer;

estimating (B) an odometer drift bias and a drift bias of a local clock of the signal receiver, by least squares resolution of a speed of the train;

correcting (B) an estimation of the ionospheric drift bias, by subtraction of the estimated odometer drift bias;

correcting (C) an integrated Doppler term using the drift bias of the local clock of the signal receiver and the ionospheric drift bias, and correcting measurements of a pseudo-distance using the ionospheric drift bias; and determining a position of the signal receiver based on at least a corrected estimated ionospheric drift bias, a corrected integrated Doppler term, and a corrected measured pseudo-distance.

2. The method as claimed in claim 1, further comprising a step, implemented when in a line of sight of the satellites of the satellite navigation system, of filtering (D) the measurements of the pseudo-distance measurements by integrated Doppler measurements stripped of their ionospheric bias over a period ranging from a few tens of seconds to a few hundreds of seconds.

3. The method as claimed in claim 2, further comprising a step, implemented when in a line of sight of the satellites of the satellite navigation system, of periodically estimating (F) an ionospheric delay error based on pseudo-distance residues derived from a code-carrier filtering, supplied by least squares resolution of a position and of a time of the signal receiver in single-frequency mode.

4. The method as claimed in claim 3, further comprising a step of:

performing a first estimation (every second) of instantaneous filtered pseudo-distance residues, obtained by a first step of least squares resolution of a position and of a time bias of the local clock of the signal receiver, then filtering these instantaneous pseudo-distance residues over a period of 10 seconds to 100 seconds, and finally correcting the pseudo-distances obtained subsequently with these stored filtered residues, over a time of 10 minutes to 30 minutes.

5. The method as claimed in claim 4, further comprising a step, implemented when in a line of sight of the satellites of the satellite navigation system, of resolving (E) by least squares the position and the time bias of the local clock of the signal receiver, on a basis of said filtered pseudo-distance measurements.

6. The method as claimed in claim 1, wherein the estimation of the integrated Doppler term determined by the signal receiver is performed over a period of between 10 and 100 seconds during which a trajectory of the train is assumed to be rectilinear.

7. The method as claimed in claim 1, wherein the estimation of the integrated Doppler term determined by the signal receiver is performed over a period of a second during which a trajectory of the train is assumed to be rectilinear.

8. A railway positioning system, based on a movement of a train determined by a signal receiver of a satellite navigation system embedded onboard the train, on a movement of said train determined by an odometer embedded onboard the train, and a map of railway tracks, by determination of an ionospheric propagation bias corresponding to a propagation bias of a signal carrier phase of the satellite navigation system, comprising:

a computer configured to perform when in a line of sight of satellites of the satellite navigation system:

estimating a biased ionospheric drift by determining a difference between an integrated Doppler term from satellite signals determined by the signal receiver and a biased estimation of the movement of the train by odometer;

estimating an odometer drift bias and a drift bias of a local clock of the signal receiver, by least squares resolution of a speed determined by the satellite navigation system;

correcting an estimation of the ionospheric drift bias, by subtraction of the estimated odometer drift bias;

correcting an integrated Doppler term using the drift bias of the local clock of the signal receiver and the ionospheric drift bias, and correcting measurements of a pseudo-distance using the ionospheric drift bias; and determining a position of the signal receiver based on at least a corrected estimated ionospheric drift bias, a corrected integrated Doppler term, and a corrected measured pseudo-distance.

* * * * *